US008673485B2

(12) United States Patent
Yamazaki et al.

(10) Patent No.: US 8,673,485 B2
(45) Date of Patent: Mar. 18, 2014

(54) CYLINDRICAL BATTERY AND GASKET FOR USE IN SAME

(75) Inventors: Tatsuya Yamazaki, Shizuoka (JP); Shuji Murakami, Shizuoka (JP); Hidenori Tsuzuki, Shizuoka (JP)

(73) Assignee: FDK Energy Co., Ltd., Shizuoka (JP)

( * ) Notice: Subject to any disclaimer, the term of this patent is extended or adjusted under 35 U.S.C. 154(b) by 0 days.

(21) Appl. No.: 13/511,198

(22) PCT Filed: Feb. 18, 2011

(86) PCT No.: PCT/JP2011/054231
§ 371 (c)(1),
(2), (4) Date: May 22, 2012

(87) PCT Pub. No.: WO2011/102557
PCT Pub. Date: Aug. 25, 2011

(65) Prior Publication Data
US 2012/0231328 A1    Sep. 13, 2012

(30) Foreign Application Priority Data

Feb. 22, 2010    (JP) .................................. 2010-036716
Jan. 12, 2011    (JP) .................................. 2011-004416

(51) Int. Cl.
*H01M 2/08*    (2006.01)
(52) U.S. Cl.
USPC ........... 429/174; 429/185; 429/169; 429/170; 429/171; 429/172; 429/224
(58) Field of Classification Search
USPC ......................... 429/174, 185, 169–172, 224
See application file for complete search history.

(56) References Cited

U.S. PATENT DOCUMENTS

| 6,206,938 B1 * | 3/2001 | Tucholski | ............. 429/174 |
| 6,312,850 B1 * | 11/2001 | Janmey | ................ 429/174 |
| 7,527,891 B2 * | 5/2009 | Janmey | ................. 429/56 |

FOREIGN PATENT DOCUMENTS

| JP | 2000-003698 | 1/2000 |
| JP | 2001-509632 | 7/2001 |
| JP | 2006-202637 | 8/2006 |
| JP | 2007-048730 | 2/2007 |
| JP | 2007-080574 | 3/2007 |
| JP | 2009-224342 | 10/2009 |
| JP | 2009-295401 | 12/2009 |

* cited by examiner

*Primary Examiner* — Milton I Cano
*Assistant Examiner* — Ling R Zeng
(74) *Attorney, Agent, or Firm* — Clark & Brody

(57) ABSTRACT

A cylindrical battery gasket that will not functionally deteriorate in absorbing stress caused by the gasket extending radially upon the battery being sealed is provided with a boss part with a central hole through which a negative electrode collector is inserted, a canister contact part that is affixed in place and in contact with a cathode canister, a disk-shaped part that is provided to connect the boss part to the canister contact part, and a stress buffering part that is provided on the way to the disk-shaped pat. The stress buffering part has a first bent part and a second bent part, both of an acute angle, and is set nearer the center of the cathode canister than to the positive electrode mixture, upon the gasket being installed in the cathode canister.

4 Claims, 4 Drawing Sheets

CYLINDRICAL BATTERY AND GASKET FOR USE IN SAME

TECHNICAL FIELD

This invention relates to a gasket that is used in sealing the opening of a cylindrical battery.

BACKGROUND ART

Generally, a cylindrical alkaline battery comprises a cylindrical cathode canister having a closed bottom, with a ring-shaped positive electrode mixture stored within the cathode canister and a gelled negative electrode mixture stored centrally within the cathode canister, with a cylindrical separator, having a closed bottom, set between the positive electrode mixture and the gelled negative electrode mixture, and a current collector provided on the opening of the cathode canister. The current collector comprises a negative terminal plate, a negative electrode collector and a sealing gasket. The negative terminal plate seals the opening of the cathode canister by the sealing gasket.

FIG. 6 shows a conventional gasket 40, used in sealing cylindrical alkaline batteries, comprising a boss part 42, a canister-contact part 43, a disk-shaped part 44 and a shear-inducible ring-shaped thin part 45. The boss part 42 has a central hole 41 through which a negative electrode collector is inserted. The canister-contact part 43 is affixed to and thus touches the inner side of the battery canister. The disk-shaped part 44 extends radially from the outer periphery of the boss part 42. The shear-inducible ring-shaped thin part 45 connects the boss part 42 to the disk-shaped part 44. When pressure within the alkaline battery rises due to forming gas, the ring-shaped thin part 45 breaks to release the gas from the alkaline battery canister, thus preventing the battery from being damaged.

A stress-buffering part 47 is formed close to the canister-contact part 43, on the outer periphery of the gasket. The stress-buffering part 47 is crooked in shape and projects downward (as seen in FIG. 6). Upon the opening of the cathode canister being sealed, this stress-buffering part 47 becomes radially deformed in absorbing the stress placed on the ring-shaped thin part 45. The stress-buffering part 47 is thinly formed to be flexible, so as to enhance its stress-absorption property. The structure of the gasket 40 is disclosed in Patent Document 1. The stress-buffering part 47 of the gasket 40, as seen cross-sectionally in FIG. 6, is U-shape bent. Other conventional gaskets, shown cross-sectionally, are S-shaped bent.

Patent Document 1: JP-A-2007-80574

SUMMARY OF THE INVENTION

Problems to be Solved by the Invention

As for alkaline batteries, other components such as a negative terminal plate or the like are set atop (as seen in FIG. 6) the gasket 40. Of the conventional gasket 40, the stress-buffering part 47 projects downward into the battery (as seen in FIG. 6). To absorb fully the radial distortion that occurs upon the battery being sealed, a certain height of the stress buffering part 47 should be secured. However, if the stress-buffering part 47 is extended inwardly within the battery, problems will arise: the canister-contact part 43 is on the periphery of the conventional gasket 40. Thus, if the stress-buffering part 47 is extended upon the battery being sealed, the stress-buffering part 47 will lap over into the same place as the positive electrode mixture. In this case, it is necessary to use a lesser amount of the positive electrode mixture, so that it will not come in contact with the stress buffering part 47 that prevents the positive electrode materials from increasing in amount, thus diminishing the performance of the battery in discharging electricity.

This invention was achieved, in light of the aforementioned problems, to provide a gasket for a cylindrical battery to secure a sufficient-sized battery without decreasing the function of the gasket in absorbing stress occurring radially upon the opening of the battery being sealed. In using such am improved gasket, the cylindrical battery is securely sufficient in providing a high discharge of electricity.

Means of Solving the Problems

Means (1) to (7) are described below to solve the aforementioned problems.

Means (1) is a cylindrical battery gasket for sealing the opening of a cylindrical battery canister, comprising a boss part with a central hole through which a negative-electrode collector is inserted, and a canister-contact part touching the inner side of the aforementioned opening, upon the battery canister being sealed, and a disk-shaped part extending radially from the outer periphery of the boss part, connecting the boss part to the canister-contact part, and a bent stress-buffering part, along the way to the disk-shaped part, which absorbs the radial distortion of the gasket upon the battery canister being sealed, whereof the aforementioned stress-buffering part, of two or more sharply-angled bent parts, is nearer the center of the battery than to the positive electrode mixture, upon the battery canister being sealed by the gasket.

Of the invention of the aforementioned Means (1), the stress-buffering part of the gasket for a cylindrical battery is a structure of two or more sharply-angled bent parts to absorb the stress of the gasket being radially distorted upon the battery canister being sealed. Applicable to the battery canister, the stress-buffering part is nearer the center of the battery canister than to the positive electrode mixture, to gain more space within the canister to hold more positive electrode mixture than does the conventional art, of which the stress-buffering part is nearer the contact part of the gasket that touches the inner side of the canister.

Means (2) is a cylindrical battery gasket, according to the means (1), above, characterized by a stress-buffering part comprising a first bent part, convexly formed within the battery canister, and a second bent part, concavely formed within the battery canister, which is nearer the periphery of the gasket than to the first bent part.

Therefore, according to the invention of Means (2), the second bent part of the stress-buffering part, on the outer periphery of the gasket, is more concavely bent within the battery canister than the first bent part. Thus, even when the stress-buffering part is distorted, upon the battery canister being sealed, the second bent part does not touch the positive electrode mixture. Using this inventive gasket, rather than the conventional one, allows for more space in the battery canister, to hold more positive-electrode mixture. The stress-buffering part, being of two bent parts of comparatively simple shape, and, being made thicker than the stress-buffering part of the conventional gasket, the flow of resin is stable upon the gasket being formed, thus reducing the chance of the gasket being ill formed.

Means (3) is a cylindrical battery gasket, according to Means (2), characterized by the concave side of the second bent part of the gasket making contact with the opening edge of the separator, upon the battery canister being sealed.

Therefore, according to the invention, as described in Means (3), the opening edge of the separator is firmly engaged to the concave side of the second bent part of the gasket, upon the battery canister being sealed, thus preventing the gasket of losing contact with the separator, so preventing the gelled negative electrode mixture from leaking out of the separator.

Means (4) is a cylindrical battery gasket, according to Means (2) or (3), characterized by the first and second bent parts, of the stress-buffering part, being connected by a reinforced section, of which the thickness is greater than that of the first bent part nearer the center of the gasket and of the second bent part on the outer periphery of the gasket.

The two bent parts of the stress-buffering part, in deflecting each other, absorb stress. Yet, if the thickness of the two bent parts is too great, they will not easily deflect, thus weakening their function. For the bent parts to be effective, their thickness should be defined within a certain range. Yet, only occasionally, a bent part will become extended due to the stress-buffering part weakening when pressure within the battery canister rises rapidly. Thus, a thin ring-shaped part, acting as a safety valve, connects the disk-shaped part to the boss part, so if the thin ring-shaped part should break, forming a gap, the gap will be plugged (by the disk-shaped part). However, of this invention, according to Means 4, the bent parts will not extend, even if pressure within the battery canister should rise rapidly, since the section connecting the first and second bent parts is reinforced. Therefore, a gap that should form by the thin part breaking will not easily be plugged, thus not properly releasing the pressure from the canister.

Means (5) is a cylindrical battery gasket, according to Means (4), characterized by the thickness of the aforementioned reinforced section of the gasket ranging from 1.20 to 2.13 times as much as the lesser value of either the first or second thickness.

Therefore, according to this invention, as described in the Means (5), the thickness of the aforementioned reinforced section preferably should be within the range, above, to meet the pressure-releasing standard of the safety valve, to prevent the battery from surely being ruined due to an abrupt rise in pressure having formed within the battery canister.

Means (6) is a cylindrical battery, according to any of Means (1) to (5), above, characterized by a shear-inducible ring-shaped thin part connecting the disk-shaped part to the first part of the boss part, with the second part of the boss part being less in diameter than the first part and nearer the opening of the battery canister, with the ratio of the outer diameter of the first part to that of the second part ranging from 0.63 to 0.90.

When the shear-inducible ring-shaped thin part breaks (the safety valve activates) due to an abrupt rise of pressure within the battery canister, gas is released, along with the contents of the battery such as the positive-electrode mixture and the negative-electrode mixture or the like. Yet, if the outer diameter of the boss part is uniform, the gap, through which gas is released due to the ring-shaped thin part breaking, shrinks and may be plugged by the escaping contents of the battery. According to this invention, however, as described in the means 6, the diameter of the (second) part of the boss, nearer the opening of the battery canister, appropriately is less than that of the (first) part of the boss, onto which the ring-shaped thin part is connected. Thus, the gap formed due to the ring-shaped thin part breaking is comparatively greater, so eliminating the possibility of the contents of the battery plugging the gap. In other words, the pressure within the canister is properly released, thus surely preventing damage to the battery. Also, since the ratio of the outer diameter of the first part of the boss to that of the second part of the boss is determined within a certain range, the pressure within the canister is stably released, without the boss part weakening.

Means (7) is a cylindrical battery, according to any one of Means (1) to (6), above, characterized by comprising a cylindrical battery gasket.

Therefore, this invention, according to Means (7), allows for a battery of greater volume by using the aforementioned preferable-shaped gasket, thus improving the performance of the battery in discharging electricity.

Effect of the Invention

As described, above, the invention, according to Means (1) to (6), provides a cylindrical battery gasket that will not functionally deteriorate upon absorbing stress caused by the gasket extending radially upon the battery being sealed, thus allowing the battery canister to hold more content than that of a conventional art. The invention, as described in Means (7), allows for a cylindrical battery to discharge more electricity by securing the contents of the battery.

MODELS FOR CARRYING OUT THE INVENTION

Figure 1:
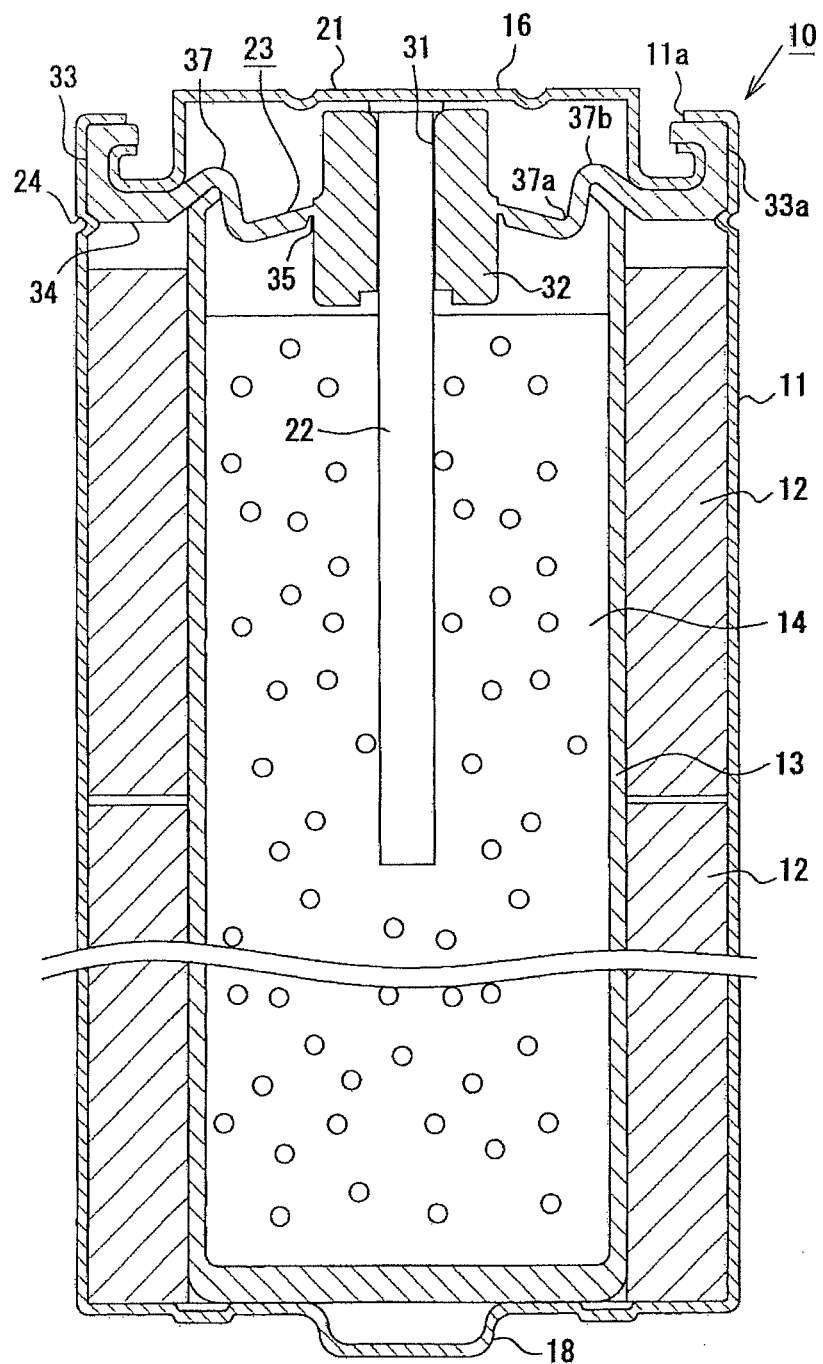
FIG. 1 is a cross-sectional view showing the structural diagram of the alkaline battery in one of the embodiments.

Hereinafter, the preferred embodiments of this invention are described in reference to the figures. FIG. 1 is a schematic cross-sectional view of the alkaline battery 10 (cylindrical battery) as a model of the embodiment and is designated as the LR6/AA battery.

As shown in FIG. 1, the alkaline battery 10 comprises a closed-bottomed positive-electrode cylindrical canister 11 (the battery canister), a ring-shaped positive-electrode mixture 12 next to the inner side of the positive-electrode canister 11, a closed-bottom separator 13 next to the positive-electrode mixture 12, a gelled negative-electrode mixture 14 centrically within the cathode canister 11, within the separator 13, and with an attached current collector 16 closing the opening 11a of the positive-electrode canister 11.

The cathode canister 11 is made of pressed nickel-plated sheet steel forming a closed-bottomed cylinder, with a protruding cathode terminal 18 centrally located at the bottom of the canister. The ring-shaped positive-electrode mixture 12 consists of a granulated powder of electrolytic manganese dioxide, graphite, potassium hydrate and a binder, which are all pressed into a cylindrical shape.

The separator 13 is made of separator paper such as vinylon-rayon non-woven fabric, polyefin-rayon non-woven fabric or the like, which is winded into a cylindrical shape, with the overlapping parts being heat sealed.

The gelled negative-electrode mixture 14 is made by dissolving zinc oxide and potassium hydrate in water and by mixing them with a gelator such as polyacrylic acid and zinc powder.

The current collector 16 comprises a negative-terminal plate 21, a negative-electrode collector 22 and a gasket 23 (cylindrical battery gasket). A bead 24 exists to facilitate fitting the current collector 16 onto the opening 11a of the cathode canister 11, with the current collector 16 being fitted onto the opening 11a by radially swaging the current collector against the bead 24, thus sealing the cathode canister 11. In other words, the cathode canister 11 is sealed by radially contracting the opening 11a and swaging it (lateral tightening method).

The bar-shaped negative-electrode collector 22, made of brass, is joined to the current collector 16 by the negative-terminal plate 21 being resistance-welded onto the head of the negative-electrode collector 22. The negative-electrode collector 22 fits through the gasket 23. The fore end of the negative-electrode collector 22 protrudes into the gelled negative-electrode mixture 14.

The negative-electrode terminal 21, made of pressed nickel-plated sheet steel, as is the positive-electrode canister 11, is sealed onto the opening 11a of the cathode canister 11 by the gasket 23 made of injected-molded resin, preferably a polyamide resin such as nylon 612, nylon 610, nylon 66 or the like.

Figure 2:
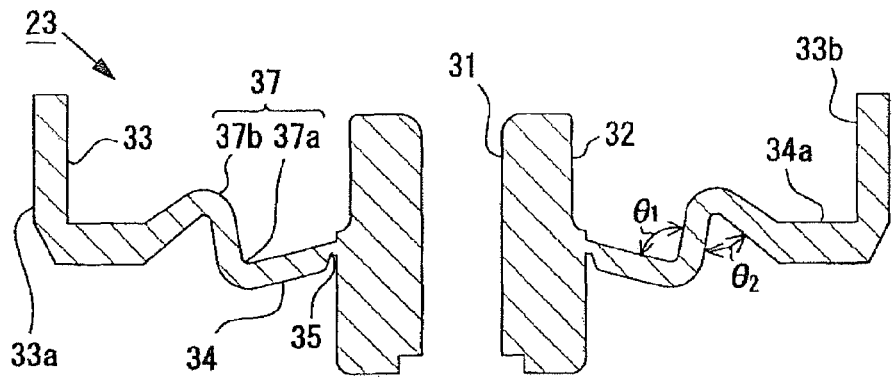
FIG. 2 is a cross-sectional view showing the sealing gasket in one of the embodiments.

As shown in FIGS. 1 and 2, the gasket 23, integrally concentrically formed, consists of a boss part 32, a canister-contact part 33, a disk-shaped part 34, a shear-inducible ring-shaped thin part 35, and a stress-buffering part 37. A central hole 31 exists in the boss parts 32, through which the negative electrode collector 22 is inserted. The canister-contact part 33 is affixed to and thus touches the inner side of the positive-electrode canister 11. The disk-shaped part 34 radially extends from the outer periphery of the boss part 32 to connect the boss part 32 to the canister-contact part 33. The shear-inducible ring-shaped thin part 35 connects the boss part 32 to the disk-shaped part 34. The stress-buffering bent part 37 is along the disk-shaped part 34.

The boss part 32 is nearly cylindrical in shape. Of the embodiment of this invention, the inner diameter of the central hole 31 of the boss part 32 is 1.25 mm. The canister-contact part 33 is on the outer periphery 33a of the ring-shaped part extending upward, with the outer periphery 33a, upon the battery canister being sealed, making contact with the inner side of the cathode canister 11.

Of this invention, the ring-shaped thin part 35 is concave-shaped, with the bottom surface of the disk-shaped part 34 (at the inner side of the cathode canister) being thinly formed of a thickness of 0.13 to 0.20 mm. The ring-shaped thin part 35 acts as a safety valve, breaking if pressure within the cathode canister 11 rises due to forming gas, to release the gas from the canister. Of the section connecting the outer periphery of the boss part 32 to the disk-shaped part 34, the angle formed between the inner side of the cathode canister 11 (at the bottom side of the disk-shaped part 34, as shown in FIG. 2) and the central axis of the cathode canister is acute.

The flat top surface 34a, which is perpendicular to the inner side 33b of the canister-contact part 33, is formed on the outer periphery of the disk-shaped part 34 and is above the positive-electrode mixture 12. The stress-buffering part 37 is nearer the center of the positive-electrode canister than to the flat surface 34a.

The stress-buffering part 37, when put into the cathode canister 11, is nearer the center of the cathode canister 11 than to the positive-electrode mixture 12 (beside the separator 13), to absorb the radial distortion of the gasket upon the sealing of the cathode canister 11. Of the embodiment of this invention, the stress buffering part 37 is of two bent parts, 37a and 37b, both of an acute angle. The first bent part 37a is convexly bent within the positive electrode canister 11. The second bent part 37b is concavely bent and nearer the outer periphery of the gasket than the first bent part 37a. The concave side of the second bent part 37b (of the stress-buffering part 37) touches the head of the separator 13.

Figure 6:
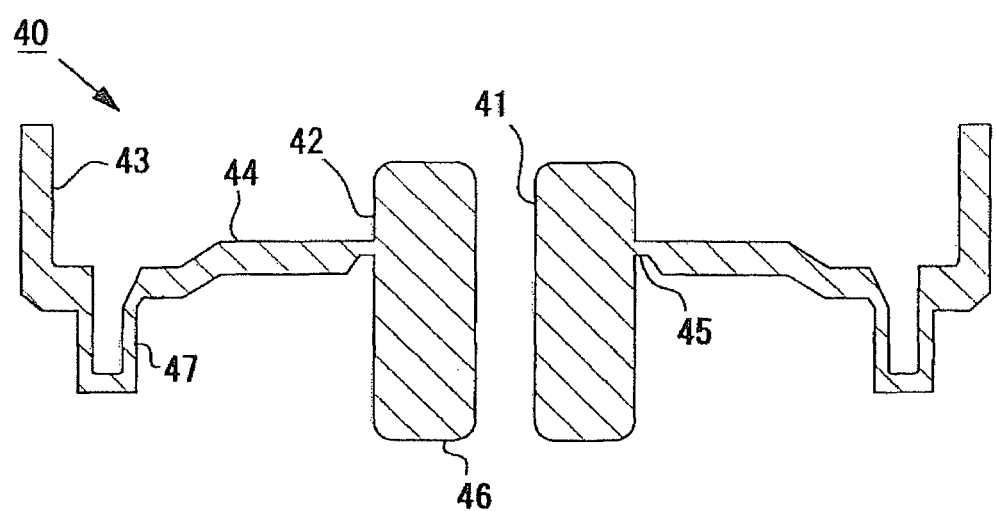
FIG. 6 is a cross-sectional view showing a conventional sealing gasket.

The thickness of the stress-buffering part 37 is 70% to 100% of the maximum thickness of the disk-shaped part 34, which is thicker compared to that of the conventional stress-buffering part 47 (as shown in FIG. 6). The angle $\theta 1$ of the concave side of the first bent part 37a is 88 degrees. The angle $\theta 2$ of the concave side of the second bent part 37b is 62 degrees. Of this invention, in other words, the stress-buffering part 37 is formed such that the angle $\theta 1$ of the concave side of the first bent part 37a is greater than the angle $\theta 2$ of the concave side of the second bent part 37b. The concave angle $\theta 1$ and concave angle $\theta 2$ of the stress-buffering parts 37a and 37b, respectively, may accordingly be changed. To firmly absorb the stress caused upon the sealing of the canister, each angle should preferably range from 60 to 89 degrees.

Using the sealing gasket 23, as described above, makes it possible to increase the volume of a battery. More specifically, of this invention, the volume of the sealing gasket 23 is 0.38 cm$^3$, a decrease in volume of 13% compared to the conventional sealing gasket 40 (volume 0.43 cm$^3$), as shown in FIG. 6, thus increasing by 13% the volume of the battery.

Therefore, the embodiments of this invention provide the following effects.

(1) Of the alkaline battery 10 of this invention, the stress-buffering part 37 of the gasket 23 has two bent parts 37a and 37b of an acute angle. Such a structure makes is possible to form the stress-buffering part 37 in a small space and firmly absorb the radial distortion of the gasket 23 upon the cathode canister 11 being sealed. Since the stress-buffering part 37, upon being put into the cathode canister 11, is set nearer the center of the cathode canister 11 than the positive-electrode mixture 12, compared to the conventional gasket 40 (as shown in FIG. 6) of which the stress-buffering part 47 is set nearer the canister-contact part 43, the battery volume of this invention is increased, thus securing sufficient space to hold more positive-electrode mixture 12 within the cathode canister 11, thereby improving the performance of the alkaline battery 10 in discharging electricity.

(2) Of the embodiment of this invention, the stress buffering part 37 of the sealing gasket 23 has a shape of which the second bent part 37b set nearer the outer periphery of the gasket is more concavely bent than the first bent part 37a within the cathode canister 11. As such, the stress-buffering part 37a does not touch the positive-electrode mixture 12 even upon the stress-buffering part 37 being deformed upon the cathode canister 11 being sealed. In other words, using the sealing gasket 23 makes it possible to secure more volume in the cathode canister 11 to hold more positive-electrode mixture 12 than by using the conventional gasket. Also, the stress-buffering part 37 is of a comparatively simple structure consisting of two bent parts 37a and 37b, with the thickness of the stress-buffering part 37 being more than 70% of the maximum thickness of the disk-shaped part 34, which, compared to the conventional stress-buffering part, lets the flow of resin in forming the gasket be stabilized, thus reducing the chances of a defective gasket forming.

(3) Of the sealing gasket 23 of this invention, the concave side of the second bent part 37b makes contact with the head of the separator 13, so firmly sealing the separator 13, thus preventing the gelled negative-electrode mixture 14 from leaking out of the separator 13.

(4) Of the sealing gasket 23 of this invention, the stress-buffering part 37 is formed such that the angle θ1 (88 degrees) of the concave side of the first bent part 37a is greater than the angle θ2 (62 degrees) of the concave side of the second bent part 37b, so that upon the cathode canister 11 being sealed, the stress-buffering part 37 properly deforms in absorbing the stress of the ring-shaped thin part 35 breaking.

Figure 3:
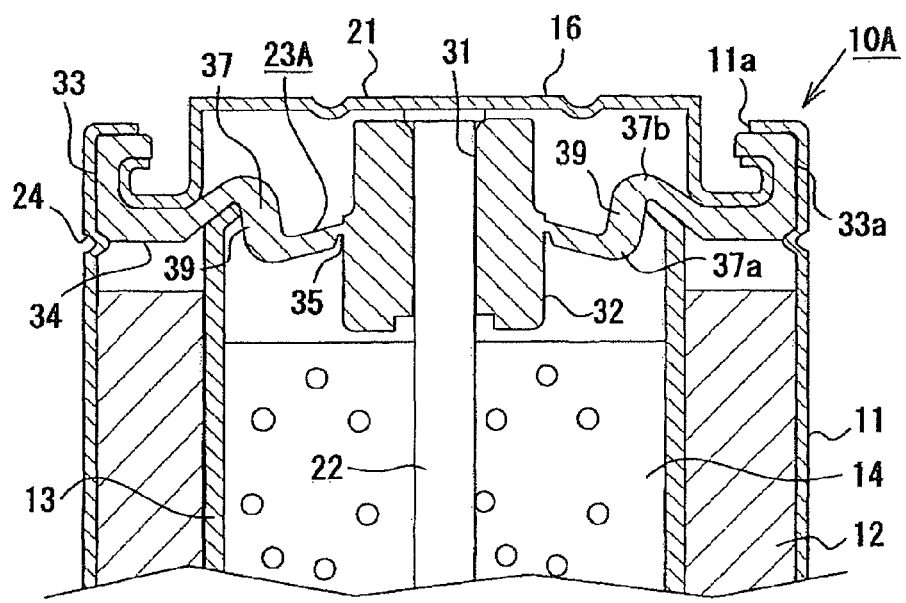
FIG. 3 is a partial cross-sectional view showing the structural diagram of the alkaline battery in another of the embodiments.
Figure 4:
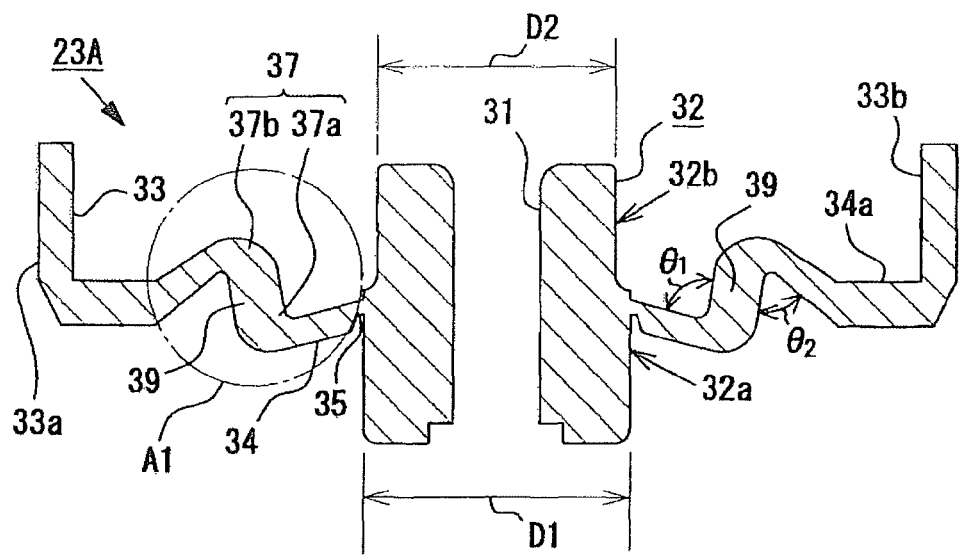
FIG. 4 is a cross-sectional view showing the sealing gasket in another of the embodiments.
Figure 5:
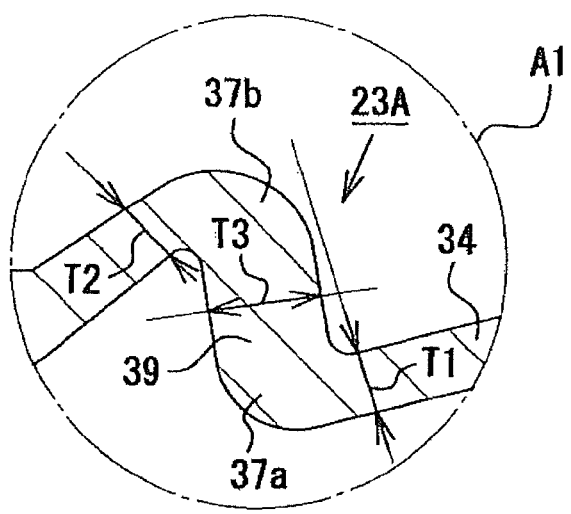
FIG. 5 is an enlarged cross-sectional view showing the essential part of the sealing gasket as described in FIG. 4.

Another embodiment of this invention is described here in reference to the figures. FIG. 3 is a partial cross-sectional view of the structural diagram of the alkaline battery 10A (cylindrical battery) of another embodiment. FIG. 4 is a cross-sectional view of the gasket 23A. FIG. 5 is an enlarged cross-sectional view of the essential part of the gasket, as described in FIG. 4. Only different features are described here. Common features of the above-named embodiment are omitted.

As described in FIGS. 3 and 4, the gasket 23A, the same as the aforementioned embodiment, comprises a boss part 32, a canister-contact part 33, a disk-shaped part 34, a shear-inducible ring-shaped thin part 35, and a stress-buffering part 37. The stress-buffering part 37 comprises a first bent part 37a and a second bent part 37b, each of an acute angle. Of the aforementioned embodiment, the thickness of the first bent part 37a, of the second bent part 37b, and of the connecting section is the same. Contrarily, of the stress-buffering part 37 of the gasket 23A of this embodiment, the section connecting the first bent part 37a to the second bent part 37b is the thicker reinforced part 39.

The thickness of the reinforced part 39, as shown in FIG. 5, is hereinafter referred to as "T3". The thickness of the area nearer the center of the gasket than to the first bent part 37a is referred to as "the first thickness T1". The thickness of the area nearer the outer periphery of the gasket than to the second bent part 37b is referred to as "the second thickness T2". Of this embodiment, the thickness T3 of the reinforced part 39 is much greater than the first thickness T1 and the second thickness T2. In FIG. 5, the first thickness T1 is seen as being equal to the second thickness T2.

The thickness T3 of the reinforced part 39 is 1.20 to 2.13 times as much as the lesser value of either the first thickness T1 or the second thickness T2. If the thickness T3 were less than 1.2 times the thickness of T1 and T2, the reinforced part 39 could not sufficiently be strong enough to prevent the bent parts 37a and 37b from elongating when pressure within the battery canister abruptly rises. Contrarily, if the thickness T3 exceeds 2.13 times the thickness of T1 and T2, the reinforced part 39 is sufficiently strong. Yet, the amount of pressure required to break the ring-shaped thin part 35 (to activate the safety valve) may not meet the predetermined standard.

Of the boss part 32 of the sealing gasket 23A, the part to which the ring-shaped thin part 35 is connected is "the first part 32a." The lesser-in-diameter part nearer the opening 11a of the cathode canister 11 is "the second part 32b." The ratio (D2/D1) between the outer diameter D1 of the first part 32a and the outer diameter D2 of the second part 32b is 0.63 to 0.90. Since the gap, that would form should the ring-shaped thin part 35 break, would be smaller if the ratio (D2/D1) is greater than 0.90, the escaping contents of the battery might plug the gap, thus likely preventing the pressure within the battery canister to be released. Contrarily, however, if the ratio (D2/D1) is less than 0.63, the thickness of the second part 32b would be less, so weakening the mechanical strength of the boss part 32

The embodiment is described more, here. Basically, some trial models of the alkaline batteries 10 and 10A (LR6) were made, using the sealing gaskets 23 and 23A of the aforementioned structure. Then, the samples 1 to 10 were obtained by changing the thicknesses T1, T2 and T3 of each part of the stress-buffering part 37, as well as changing the outer diameters D1 and D2 of each part of the boss part 32. Sample 1 has the structural feature of the sealing gasket 23. Samples 2 to 10 have the structural feature of the sealing gasket 23A. The following three different tests (short-circuit test, boss-damaged test, and a test to determine the amount of pressure required to activate the safety valve) were done on the 10 different samples. The results are shown in Chart 1.

The short-circuit test or "the four-in-series direct-current one adverse-current short-circuit-damage test" was conducted, which consists of four batteries being connected in series, with one battery intentionally adversely connected to induce a short circuit. Then, the number of damaged batteries is counted. (Number of test samples: 60)

Of the boss-damage test, a special pin, being thicker than the negative-electrode collector 22, is pressed through the boss part 32 of a battery to determine if the battery is damaged. (Number of test samples: 320)

The test confirming the amount of internal pressure required to activate the safety valve determines if the amount required to break the ring-shaped thin part 35 exceeds the predetermined value or not. If the amount of internal pressure does not exceed that value, the amount is considered being within the standard. If the amount of internal pressure does exceed that value, the amount is considered not being within the standard.

CHART 1

| No. | Thickness T1, T2 (mm) | Thickness T3 (mm) | Ratio of thickness | Valve activating pressure | Outer diameter D1(mm) | Outer diameter D2(mm) | Ratio of outer diameters (D2/D1) | Four direct, One adverse/ Short circuit | Boss damage | Result |
|---|---|---|---|---|---|---|---|---|---|---|
| 1 | 0.40 | 0.40 | 1.00 | Within the standard | 4.0 | 4.0 | 1.00 | 4/60 | 0/320 | x |
| 2 | 0.40 | 0.45 | 1.13 | Within the standard | 4.0 | 3.6 | 0.90 | 1/60 | 0/320 | x |
| 3 | 0.40 | 0.50 | 1.20 | Within the standard | 4.0 | 3.6 | 0.90 | 0/60 | 0/320 | o |
| 4 | 0.40 | 0.60 | 1.50 | Within the standard | 4.0 | 3.6 | 0.90 | 0/60 | 0/320 | o |
| 5 | 0.40 | 0.85 | 2.13 | Within the standard | 4.0 | 3.6 | 0.90 | 0/60 | 0/320 | o |
| 6 | 0.40 | 0.90 | 2.25 | Within the standard | 4.0 | 3.6 | 0.90 | 0/60 | 0/320 | x |
| 7 | 0.40 | 0.60 | 1.50 | Within the standard | 4.0 | 3.7 | 0.93 | 2/60 | 0/320 | x |

CHART 1-continued

| No. | Thickness T1, T2 (mm) | Thickness T3 (mm) | Ratio of thickness | Valve activating pressure | Outer diameter D1(mm) | Outer diameter D2(mm) | Ratio of outer diameters (D2/D1) | Four direct, One adverse/ Short circuit | Boss damage | Result |
|---|---|---|---|---|---|---|---|---|---|---|
| 8 | 0.40 | 0.60 | 1.50 | Within the standard | 4.0 | 3.4 | 0.85 | 0/60 | 0/320 | ○ |
| 9 | 0.40 | 0.60 | 1.50 | Within the standard | 4.0 | 2.5 | 0.63 | 0/60 | 0/320 | ○ |
| 10 | 0.40 | 0.60 | 1.50 | Within the standard | 4.0 | 2.4 | 0.60 | 0/60 | 5/320 | x |

As shown by Sample No. 1 in Chart 1, above, the damage to the boss part was not identified. Yet, the amount of internal pressure that activated the safety valve was within the standard value. Yet, some damage was caused by the gelled negative-electrode mixture 14 congealing and by the stress-buffering part 37 deforming excessively (the bent parts 37a and 37b elongating). For example, the damage to Sample Nos. 2 and No. 6, respectively, was caused by the stress-buffering part 37 deforming excessively and by the negative-electrode mixture 14 congealing. In Sample No. 10, the boss part 32 was thin. Thus, it broke due to being weak. In Sample Nos. 3 to 5, 8 and 9, however, neither general damage or damage to the boss part was caused by the amount of pressure required to activate the safety valve not being within the standard value. Considering the aforementioned results, it is preferable that the thickness T3 of the reinforced part 39 be 1.20 to 2.13 times as great as the first thickness T1 and second thickness T2, and that the difference in ratio of the diameter D2 of the second part 32b and of the diameter D1 of the first part 32a (D2/D1) be 0.63 to 0.90 times.

The embodiments of this invention can be altered in the following way.

The aforementioned embodiments are of a common structure, of the stress buffering part 37 comprising two bent parts 37a and 37b, each of an acute angle. Yet, the stress-buffering part may also comprise three or more bent parts, each of an acute angle.

Although the aforementioned embodiments were used in developing the sealing gaskets 23 and 23A for the alkaline batteries 10 and 10A, they may also be used in developing sealing gaskets for cylindrical batteries instead of for alkaline batteries. Also, the aforementioned embodiments were made for the (AA cell) LR6 alkaline battery 10. Yet, the embodiments may also be made for the (D cell) LR20 battery, for the (C cell) LR14 battery, and for the (AAA cell) LR03 battery or the like.

Besides the technical ideas as described within the scope of the claims, another technical idea that was conceived from the foregoing embodiments is described here.

1. Of Means (1) to (6), a cylindrical battery gasket is characterized by it being used in the aforementioned battery canister when the canister is sealed by radially contracting and swaging the opening of the battery canister.

2. Of any of Means (1) to (6), a cylindrical battery gasket is characterized by the aforementioned stress-buffering part being formed nearer the center of the battery canister than to the wall of the separator.

3. Of any of Means (4) to (6), a cylindrical battery gasket is characterized by the aforementioned first thickness and second thickness being 70% to 100% of the maximum thickness of the aforementioned disk-shaped part.

4. Of any of Means (1) to (6), a cylindrical battery gasket is characterized by the disk-shaped part (the flat surface perpendicular to the inner side of the canister-contact part) being formed on the outer periphery of the gasket, above the positive-electrode mixture 12.

5. Of any of Means (2) to (6), a cylindrical battery gasket is characterized by the concave angle of the aforementioned first bent part being greater than the concave angle of the aforementioned second bent part.

6. Of any of Means (2) to (6), a cylindrical battery gasket is characterized by the concave angle of the first bent part and the concave angle of the second bent part being from 60 to 89 degrees.

7. Of any of Means (4) to (6), a cylindrical battery gasket is characterized by the aforementioned first thickness being equal to the aforementioned second thickness.

8. Of any of Means (1) to (6), a cylindrical battery gasket is characterized by an acute angle being formed on the section connecting the outer periphery pf the boss part to the disk-shaped part between the inner side of the positive electrode canister 11 and the central axis of the positive-electrode canister 11.

DESCRIPTION OF REFERENCE SIGNS 10, 10A: Alkaline battery as a cylindrical battery
11: Cathode canister as a battery canister
11a: Opening
22: Negative-electrode collector
23, 23A: Gasket for sealing a cylindrical battery
31: Central hole
32: Boss part
32a: First part (of the boss)
32b: Second part (of the boss)
33: Canister-contact part
34: Disk-shaped part
35: Ring-shaped thin part
37: Stress-buffering part
37a: First bent part
37b: Second bent part
39: Reinforced section
T1: First thickness
T2: Second thickness
T3: Thickness (of reinforced section)

What is claimed is:

1. A cylindrical battery gasket comprising a battery canister, a gasket for sealing an opening of the battery canister, a ring-shaped positive electrode mixture and a cylindrical separator with a bottom inserted into an inner side of the ring-shaped positive electrode mixture, characterized in that the gasket comprises:
   a boss part with a central hole through which a negative-electrode collector is inserted, and a canister-contact part touching an inner side of the opening, upon the battery canister being sealed, a disk-shaped part extending radially from an outer periphery of the boss part, connecting the boss part to the canister-contact part, and a bent stress-buffering part being part of the disk-shaped part, and which absorbs the radial distortion of the gasket upon the battery canister being sealed, the stress-buffering part including two or more sharply-angled bent parts, and being nearer a center of the battery than to the positive electrode mixture, upon the battery canister being sealed by the gasket, the two or more sharply-angled bent parts further comprising a first bent part, convexly formed within the battery canister, and a second bent part, concavely formed within the battery canister, which is nearer an outer periphery of the gasket than to the first bent part, the first and second bent parts being connected by a reinforced section, which extends between the first and second bent parts and has a thickness along an entire length thereof in an at rest state that is greater than that of the first bent part nearer the center of the gasket and of the second bent part on the outer periphery of the gasket, wherein a first section connecting the boss part and the first bent part is slanted downwardly in a direction from the boss part of the gasket towards the outer periphery of the gasket, the reinforced section extending from the first bent part towards the second bent part is slanted upwardly in a direction from the boss part of the gasket toward the outer periphery of the gasket, a second section extending from the second bent part and connecting the second bent part and the canister-contact part is slanted downwardly in a direction from the boss part of the gasket to the outer periphery of the gasket, the second section also having an area cross-sectionally tapered that expands towards the outer periphery of the gasket, and the separator has an upper opening portion which projects inwardly towards a central axis of the battery, with a free end of the upper opening portion contacting the concave side of the second bent part.

2. A cylindrical-battery gasket, according to claim 1, characterized by the thickness of the reinforced section of the gasket ranging from 1.20 to 2.13 times as much as a lesser value of thicknesses of the first and second bent parts.

3. A cylindrical battery, according to claim 1, characterized by a shear-inducible ring-shaped thin part connecting the disk-shaped part to a first part of the boss part, with a second part of the boss part being less in diameter than the first part and positioned between the first part of the boss part and the opening of the battery canister, the ring-shaped thin part being located near an unevenness between the first part and the second part, with the ratio of the outer diameter of the first part to that of the second part ranging from 0.63 to 0.90.

4. A cylindrical battery comprising the cylindrical battery gasket of claim 1.

* * * * *